United States Patent
Spinella-Mamo et al.

(10) Patent No.: US 9,619,933 B2
(45) Date of Patent: Apr. 11, 2017

(54) MODEL AND SIZING INFORMATION FROM SMARTPHONE ACQUIRED IMAGE SEQUENCES

(71) Applicant: Replica Labs, Inc., San Antonio, TX (US)

(72) Inventors: Vincent Paul Spinella-Mamo, Boca Raton, FL (US); Brandon Minor, Boulder, CO (US); Isaac Roberts, San Antonio, TX (US); John Morrison, Boulder, CO (US)

(73) Assignee: Occipital, Inc, Boulder, CO (US)

( * ) Notice: Subject to any disclaimer, the term of this patent is extended or adjusted under 35 U.S.C. 154(b) by 169 days.

(21) Appl. No.: 14/740,323

(22) Filed: Jun. 16, 2015

(65) Prior Publication Data

US 2015/0363970 A1    Dec. 17, 2015

Related U.S. Application Data

(60) Provisional application No. 62/012,436, filed on Jun. 16, 2014.

(51) Int. Cl.
*G06T 17/00* (2006.01)
*G06T 5/00* (2006.01)
*G06T 7/593* (2017.01)

(52) U.S. Cl.
CPC .............. *G06T 17/00* (2013.01); *G06T 5/002* (2013.01); *G06T 7/596* (2017.01); *G06T 2200/08* (2013.01); *G06T 2207/10016* (2013.01)

(58) Field of Classification Search
None
See application file for complete search history.

(56) References Cited

U.S. PATENT DOCUMENTS

| | | |
|---|---|---|
| 7,630,522 B2 | 12/2009 | Popp et al. |
| 8,014,588 B2 | 9/2011 | Rudin et al. |
| 8,467,628 B2 | 6/2013 | Coffman |
| 8,655,053 B1 | 2/2014 | Hansen |
| 8,849,620 B2 | 9/2014 | Regan et al. |
| 8,929,645 B2 | 1/2015 | Coffman |
| 2007/0183653 A1 | 8/2007 | Medioni et al. |

(Continued)

FOREIGN PATENT DOCUMENTS

| | | |
|---|---|---|
| EP | 2335220 A2 | 6/2011 |
| WO | WO 2013029675 A1 | 3/2013 |

(Continued)

OTHER PUBLICATIONS

Newcombe, Richard et al "DTAM: Dense tracking and mapping in real-time." Computer Vision (ICCV), 2011 IEEE International Conference on. (pp. 2320-2327).

(Continued)

*Primary Examiner* — Michelle Chin
(74) *Attorney, Agent, or Firm* — MamoTIP, LLC

(57) ABSTRACT

A method for providing a model file to a user. The user acquires a plurality of images using a device, such as a smart phone, with at least a monocular image capture device. The plurality of images are then processed to provide the user with a model file. The model file is created by a minimization of an energy which is done using a primal-dual hybrid gradient. The model file may be used in a printer capable of printing in three dimensions. The user is either charged a fee for uploading the plurality of images, downloading the model file, or both.

20 Claims, 6 Drawing Sheets

(56) References Cited

U.S. PATENT DOCUMENTS

| | | |
|---|---|---|
| 2007/0211921 A1 | 9/2007 | Popp et al. |
| 2008/0292179 A1 | 11/2008 | Busch |
| 2009/0010507 A1 | 1/2009 | Geng |
| 2010/0319100 A1 | 12/2010 | Chen et al. |
| 2012/0120198 A1 | 5/2012 | Yu et al. |
| 2013/0315475 A1 | 11/2013 | Song et al. |
| 2014/0050357 A1 | 2/2014 | Benhimane et al. |
| 2014/0198976 A1 | 7/2014 | Coffman |
| 2014/0293016 A1 | 10/2014 | Benhimane et al. |
| 2014/0340489 A1 | 11/2014 | Medioni et al. |
| 2015/0142394 A1 | 5/2015 | Mehr et al. |
| 2015/0146971 A1 | 5/2015 | Robert et al. |

FOREIGN PATENT DOCUMENTS

| | | |
|---|---|---|
| WO | WO 2014191055 A1 | 12/2014 |
| WO | WO 2015043872 A1 | 4/2015 |

OTHER PUBLICATIONS

Newcombe Richard, "Dense Visual Slam", Thesis, Dec. 2012, Imperial College, London.

MODEL AND SIZING INFORMATION FROM SMARTPHONE ACQUIRED IMAGE SEQUENCES

CROSS REFERENCE TO RELATED APPLICATIONS

This application claims the benefit of the filing date under 35 USC 119(e) of the provisional application entitled "Model Generation" Ser. No. 62/012,436, filed on Jun. 16, 2014, the entire contents of which is fully incorporated herein by reference.

FIELD OF THE INVENTION

The present disclosure generally relates to a method for providing a user with a three dimensional model file. More particularly, the present disclosure relates to a method for acquiring images using a device with at least one image capture device, such as a smart phone, and converting the plurality of images acquired into a model file.

BACKGROUND OF THE INVENTION

The present invention provides a method for providing a computer generated model to an end user. Currently, the field of 3D (three dimensional) printing and scanning solutions are limited to additional hardware components. These methods include laser scanning, structured light sources, and multiple image capture device solutions.

As the field of printing in three dimensions grows (3D printing), there is a greater and greater desire for a method to capture objects in the world and either reproduce them with a 3D printer, or share and modify these objects in the digital world. As previously mentioned, some of the mechanisms currently available for allowing a user to scan and capture an object in the digital world in three dimensions require additional hardware. This creates additional expenses and software requirements for a user. For example, it is possible to create an estimate of the depth of a scene by simultaneously acquiring images with multiple image capture devices, by using a known and structured light source, by using a laser solution, or some combination thereof What is desired is a method to provide an end user with a 3D model of an object that can be generated from a simple handheld smart phone.

SUMMARY OF THE INVENTION

The basic inventive concept provides a method for providing a 3D model to a user.

A first aspect of the present invention provides a system for providing a user with a 3D model including a non-transitory computer readable medium having instruction that, when executed, cause one or more processors to perform the following steps: a. receive a plurality of images from an image capture device which was at least 15 cm from a surface, but not more than 1m from the surface; b. determine a pose of the image capture device for each image in the plurality of images, camera intrinsics for the capture device including a focal point and an image center, and one or more radial distortion factors; c. rectify each image in the plurality of images using the one or more radial distortion factors; d. create a buffer of 60 sequential images from the plurality of images; e. select a reference image from the buffer; f. select a subset of 20 comparison images from the buffer such that each comparison image is at least 0.5 cm to 2.0 cm from any other comparison image and the reference image; g. generate a cost volume from the subset of comparison images and the reference image; h. estimate a depth image from the cost volume; i. fuse the depth image into a signed distance function (SDF); j. shift the buffer by removing the first 20 frames and adding 20 more sequential images from the plurality of images to the end of the buffer; k. repeat steps e through j until there are no more images in the plurality of images; l. create a 3D model from the signed distance function; and m. send the 3D model to an end user, wherein the 3D model generated is of an object placed on the surface.

In another aspect of the invention, the cost volume is a volumetric representation, having a two dimensional pixel coordinate and a one dimensional inverse depth coordinate, each voxel of the volume storing an average reprojection error between each pixel in the reference image with each corresponding pixel of every image of the comparison images, parameterized by a number of levels of inverse depth from a minimum inverse depth to a maximum inverse depth and further where the reprojection error is one of the set comprised of an absolute value of a difference in intensity values of each pixel located in the reference image and each corresponding pixel in every comparison image, a sum of absolute differences of a patch centered at each pixel in the reference image and each corresponding pixel in every comparison image, a sum of squared differences of a patch centered at each pixel in the reference image and a patch centered at each corresponding pixel in every comparison image, and a Hamming distance of a census value of each pixel in the reference image and each corresponding pixel in every comparison image, and further wherein the corresponding pixel is calculated via a warping function.

In a further aspect of the invention, the number of levels of inverse depth is 64 and the minimum inverse depth is 0.4 $m^{-1}$ and the maximum inverse depth is 5 $m^{-1}$.

In yet another aspect of the invention, the depth image is estimated from the cost volume by performing a search for a minimum reprojection error at each pixel coordinate along the inverse depth coordinate and further wherein the inverse of the inverse depth coordinate corresponding to the mimimum reprojection error represents the depth at each pixel coordinate and further wherein the linear search over the cost volume is performed in parallel on a graphics processing unit.

In a further aspect of the invention, the depth image is further refined by performing the steps comprising: a. denoising the depth image by minimizing the energy of a total variation regularizer of depth and an L1 norm of the difference of the initial depth estimate and a denoised depth estimate using a primal-dual hybrid gradient descent in parallel on a graphics processing unit to create a denoised depth image; b. using the denoised depth image as an initialization for a wide-baseline refinement by using four additional images from the buffer which are further from the reference image than the comparison images, but not more than 80 cm away from the reference image and performing a primal-dual hybrid gradient on an error function representation of a first order linear expansion of a sum of a photometric error of the four additional images with respect to a depth coordinate in addition to a weighted Huber regularizer, performed on a graphics processing unit.

In yet another aspect of the invention, the pose of the image capture device associated with every image is determined by placing a grid consisting of a regular pattern of rows and columns of a first shape and a second shape of known sizes on the surface, such that any observed subset of the grid provides an initial estimate of a pose for every observation and subsequently performing a non-linear least squares optimization over a cost comprised of pose information and camera calibration information on the initial poses for every observation of the surface to refine the pose associated with every image, as well as determine the camera intrinsics and one or more radial distortion factors.

In another aspect of the invention, the first shape is a circle and the second shape is a circle having a radius of a size which can be differentiated from the first shape.

In a further aspect of the invention, the pose and camera intrinsics of the image capture device for every image is determined by extracting features selected from the set comprised of FAST, FREAK, ORB, BRIEF, SIFT, SURF, and AKAZE for every image in the sequence of images, performing feature matching between features extracted on every images to determine a set of matched features, and implementing a non-linear least squares optimization for the poses and camera calibration and one or more radial distortion parameters using a cost function which is a function of reprojection error of the matched features.

In still another aspect of the invention, the fusing of depth estimates is done by projecting the depth values from the pose of the image capture device into the SDF, the SDF having 400×400×400 contiguous voxel elements, each voxel representing $\frac{1}{400}$th of a meter on each side such that the SDF as a whole represents 1 m$^3$, and further wherein the SDF is initialized at a location by performing a non-linear least squares optimization to determine a principle focus point, where the principle focus point is a point which is observed in a most amount of images from the image sequence, using an X and a Y coordinate of the principle point to center the SDF on an X-Y plane, and choosing a Z-coordinate of the SDF such that a lowest level of the SDF is located 5 cm below the surface.

In still another aspect of the invention, the 3D model is created from the SDF by assigning each voxel of the SDF an index, where the index is based on distance information contained in all neighboring voxels, and further wherein a mesh element is created at a voxel position based on the index.

As another aspect of the invention each pose of an image capture device is further refined by performing the following steps: a. performing a raycasting operation on the SDF from the pose of the reference frame to generate a reference depth image and a weighting image; and b. performing a non-linear least squares optimization of the pose by minimizing a reprojected cost for every pixel in the reference image as compared with a comparison image as reprojected through the reference depth image and further wherein the optimization is initialized with the relative pose between the reference image and the comparison image and further where the reprojection cost of every pixel is weighted by a corresponding pixel in the weighting image.

In a further aspect of the invention, a desired resolution of the 3D model is selected by a user and, based on the resolution selected, the end user is charged a fee, and further wherein the 3D model is not transferred to the end user until the fee has been paid.

In yet another aspect of the invention, the 3D model is of an object selected from the set comprised of a foot, a hand, a body, and a head, and further wherein the 3D model is used to suggest an optimal garment size.

In another aspect of the invention, the 3D model is sent to a 3D printer.

In still another aspect of the invention, the image capture device and the one or more processors are not co-located on, or connected within, a single device.

As another aspect of the invention, the cost function also comprises other sensor data and further wherein the other sensor data is data from the set comprised of laser range data, accelerometer data, gyroscopic data, magnetic field data, and global positioning system data.

The invention also provides for a method for providing a user with a 3D model comprising the following steps: a. sending a plurality of images from an image capture device which was at least 15 cm from a surface, but not more than 1 m from the surface to one or more processors; b. determining a pose of the image capture device for each image in the plurality of images, camera intrinsics for the capture device including a focal point, an image center, and one or more radial distortion factors; c. rectifying each image in the plurality of images using the one or more radial distortion factors; d. creating a buffer of 60 sequential images from the plurality of images; e. selecting a reference image from the buffer; f. selecting a subset of 20 comparison images from the buffer such that each comparison image is at least 0.5 cm to 2 cm from any other comparison image or the reference image; g. generating a cost volume from the subset of comparison images and the reference image; h. estimating a depth image from the cost volume; i. fusing the depth image into a signed distance function (SDF); j. shifting the buffer by removing the first 20 frames and adding 20 more sequential images from the plurality of images to the end of the buffer; k. repeating steps e through j until there are no more images in the plurality of images; l. creating a 3D model from the signed distance function; and m. sending the 3D model to an end user, wherein the 3D model generated is of an object placed on the surface.

In a further aspect of the invention, the pose of the image capture device associated with every image is determined by placing a grid consisting of a regular pattern of rows and columns of a first shape and a second shape of known sizes on the surface, such that any observed subset of the grid provides an initial estimate of a pose for every observation and subsequently performing a non-linear least squares optimization over a cost comprised of pose information and camera calibration information on the initial poses for every observation of the surface to refine the pose associated with every image, as well as determine the camera intrinsics and one or more radial distortion factors.

In yet another aspect of the invention, the pose and camera intrinsics of the image capture device for every image is determined by extracting features selected from the set comprised of FAST, FREAK, ORB, BRIEF, SIFT, SURF, and AKAZE for every image in the sequence of images, performing feature matching between features extracted on every images to determine a set of matched features, and implementing a non-linear least squares optimization for the poses and camera calibration and one or more radial distortion parameters using a cost function which is a function of reprojection error of the matched features.

As another aspect of the invention, a desired resolution of the 3D model is selected by the end user and, based on the desired resolution, the end user is charged a fee, and further wherein the 3D model is not transferred to the end user until the fee has been paid.

These and other advantages of the invention will be further understood and appreciated by those skilled in the art by reference to the following written specification, claims and appended drawings.

BRIEF DESCRIPTION OF THE DRAWINGS

The invention will now be described, by way of example, with reference to the accompanying drawings, where like numerals denote like elements and in which.

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
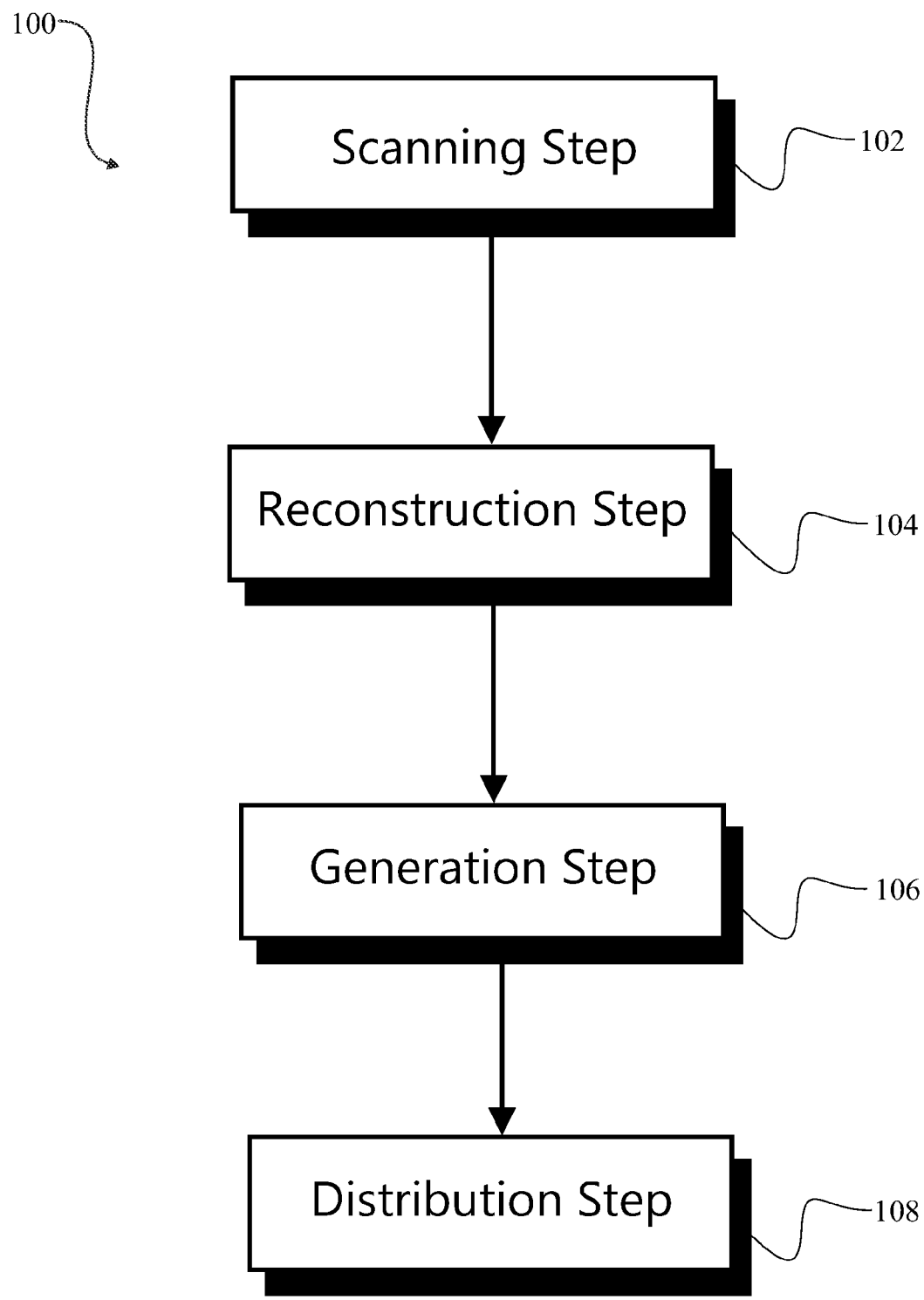
FIG. 1 presents a flow diagram illustrating a method for providing a model file to a user.

A method for providing a 3D model to a user is shown in FIG. 1. As shown, the method 100, comprises a scanning step 102, a reconstruction step 104, a generation step 106, and a distribution step 108.

Figure 2:
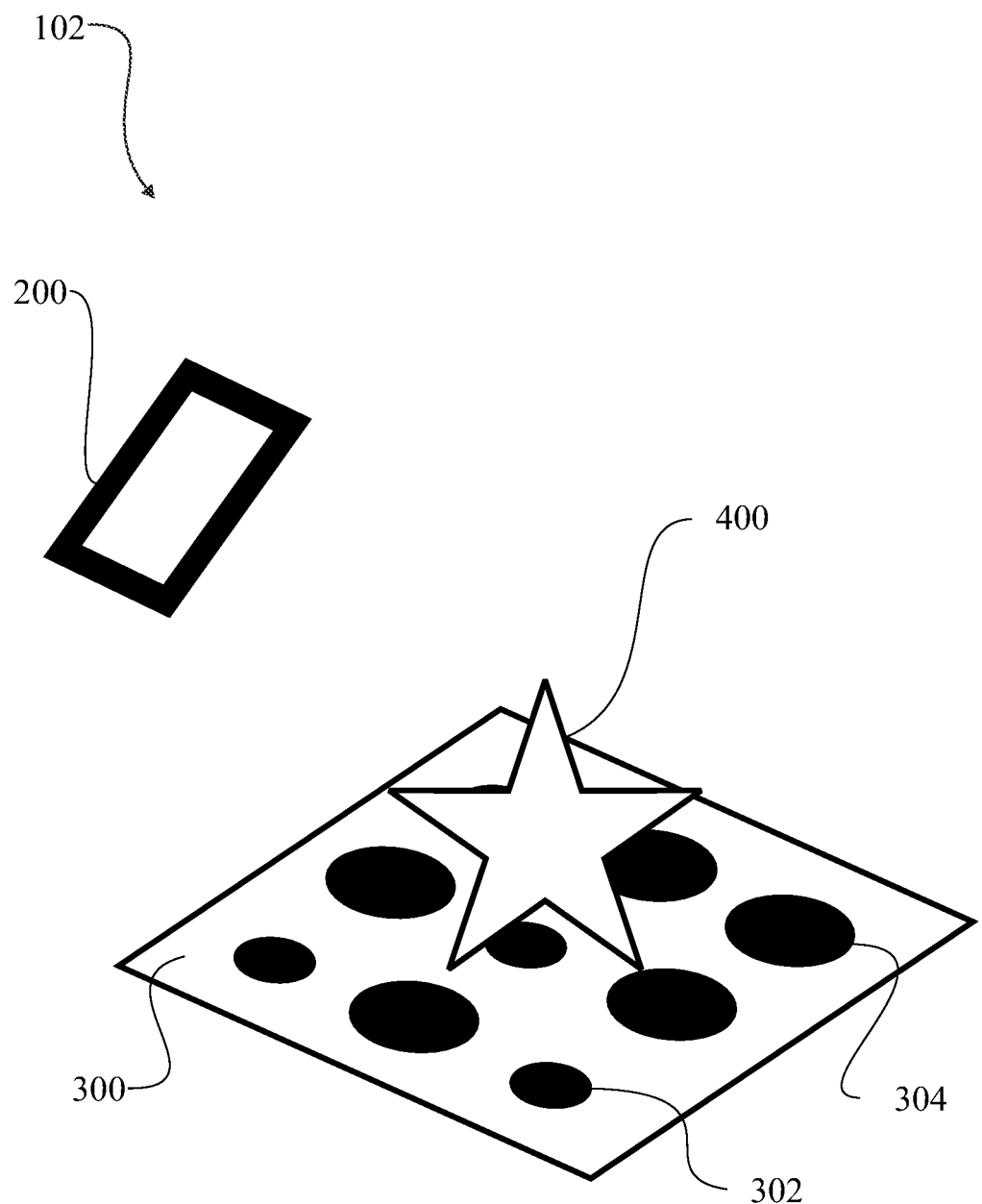
FIG. 2 presents an illustration of a scanning step which comprises a device, an object to be scanned, and a specialized surface on which the object is scanned.
Figure 4:
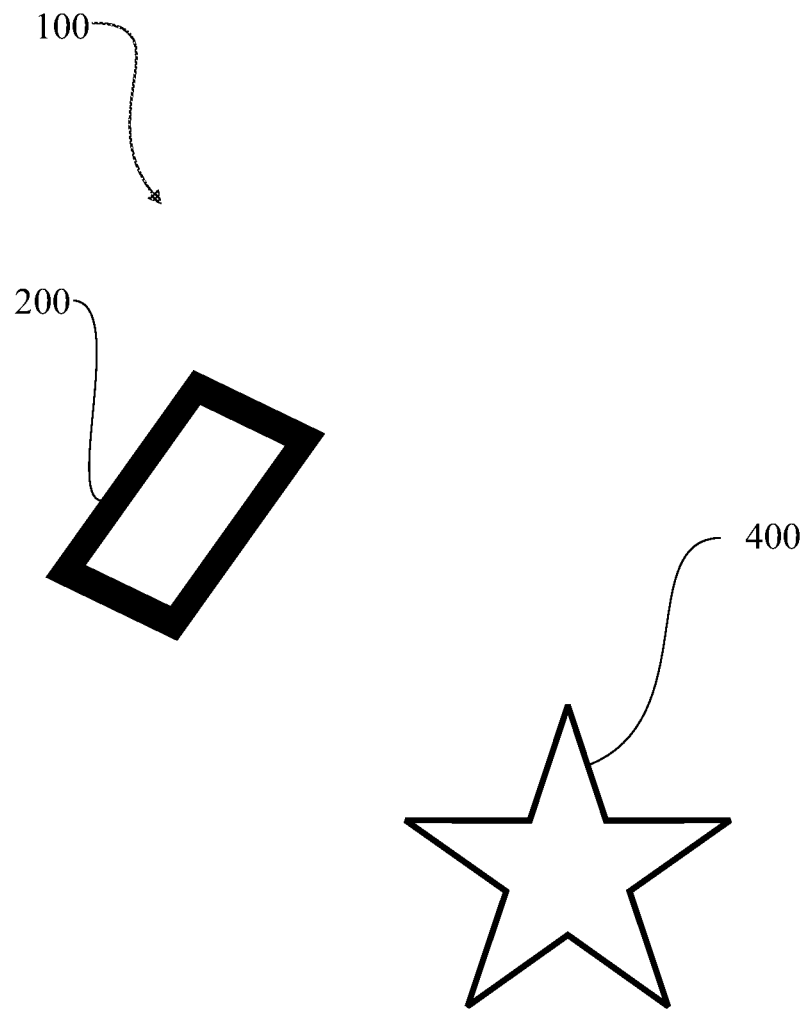
FIG. 4 presents an alternative embodiment of the scanning step which uses only a device and an object to be scanned.

As shown in FIGS. 2 and 4, a device 200 is used to capture a plurality of images 204. For exemplary purposes, the device 200 may be a smartphone, although a, a video camera, or any other device which is capable of capturing images is contemplated, an image capture device. In one embodiment, when a user desires to create a digital 3D model of an object 400, the user places the object 400 onto a surface 300. The surface 300 may be marked with indicia so as to determine the pose of the device 200 relative to the surface 300. For exemplary purposes, the surface 300 may be covered in a regular pattern of two distinct shapes, a first shape 302 and a second shape 304, although any number of shapes can be used. The regular pattern may be a series of rows and columns. There may be a different number of first shapes 302 and second shapes 304 contained in the regular pattern. The first shapes 302 and second shapes 304 are randomly distributed over the regular pattern. The random distribution of first shapes 302 and second shapes 304 enables an image detector to determine a specific location on the surface 300, as seen in an image acquired by the device 200, using only a subset of the surface 300. In this manner, even though the entirety of the surface 300 may not be visible in the device 200, it is still possible to locate the relative pose of the device 200 to the surface 300. For exemplary purposes, as shown in FIG. 2, the shapes are a small circle 302 and a large circle 304. Although different sizes are shown for exemplary purposes, different eccentricities, shapes, QR codes, or multiple augmented reality tags can be used.

Figure 3:
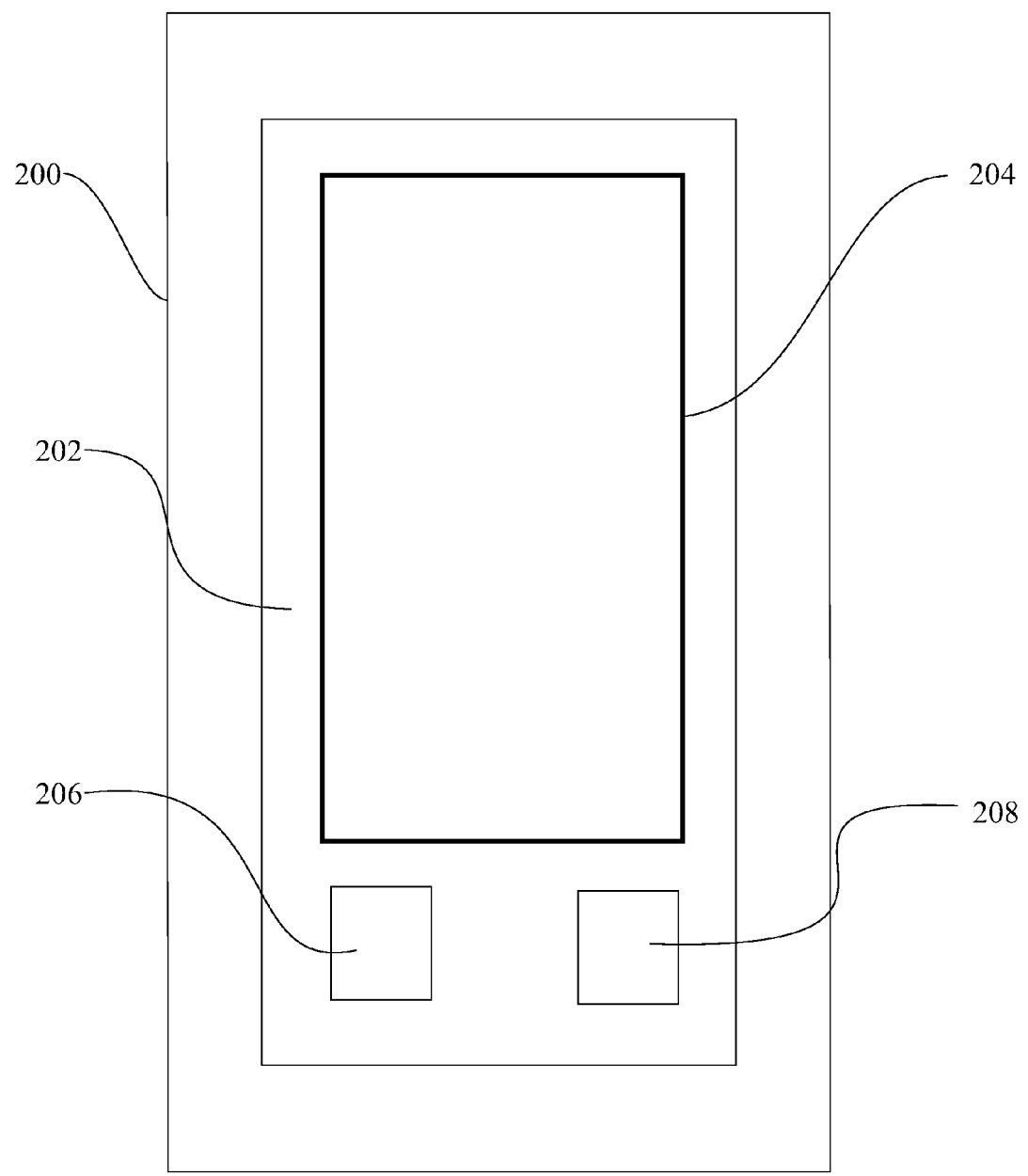
FIG. 3 presents an detailed illustration of a device used in a scanning step.

For exemplary purposes, as shown in FIG. 3, the device 200 has a display portion 202. The display portion 202 is capable of providing a preview 204 of the plurality of images to be acquired. The display portion 202 is also capable of displaying a record button 206, as well as a process button 208. The display portion 202 is capable of receiving input from a user via a touch event associated with either the record button 206 or the process button 208. Alternatively, the device 200 may not have a display portion 202, but instead have a physical button or switch that would act as the record button 206 or process button 208. The device 200 may also be equipped with a communication mechanism which would allow the record button 206 or process button 208 to be triggered remotely. For exemplary purposes, the communication mechanism may be an RF transmitter / receiver, a wired connection to a network, or an optical transmission mechanism.

Once the object 400 is placed on the surface 300, the device 200 is then placed into a recording mode. The device 200 is placed into the recording mode by a trigger event associated with the record button 206. In the recording mode, the device 200 will capture a plurality of images using an image capture device and save the plurality of images in digital format on a computer readable medium. Alternatively, the plurality of images may be streamed to a processer on a remote server 700 directly and stored on a computer readable medium on the remote server 700. For exemplary purposes, the computer readable medium may be a hard drive, flash drive, a CD-ROM, or DVD, though other computer readable media are also contemplated. The plurality of images may either be stored as a video, or as a collection of photographs. The user captures images from all angles around the object 400. When the user finishes scanning the object 400, a process button 208 is pressed, which signals a process trigger event. The process trigger event signals the end of the scanning step 102. Once the process trigger event is signaled, the device 200 stops acquiring the plurality of images and transfers the plurality of images to a processor.

Figure 5:
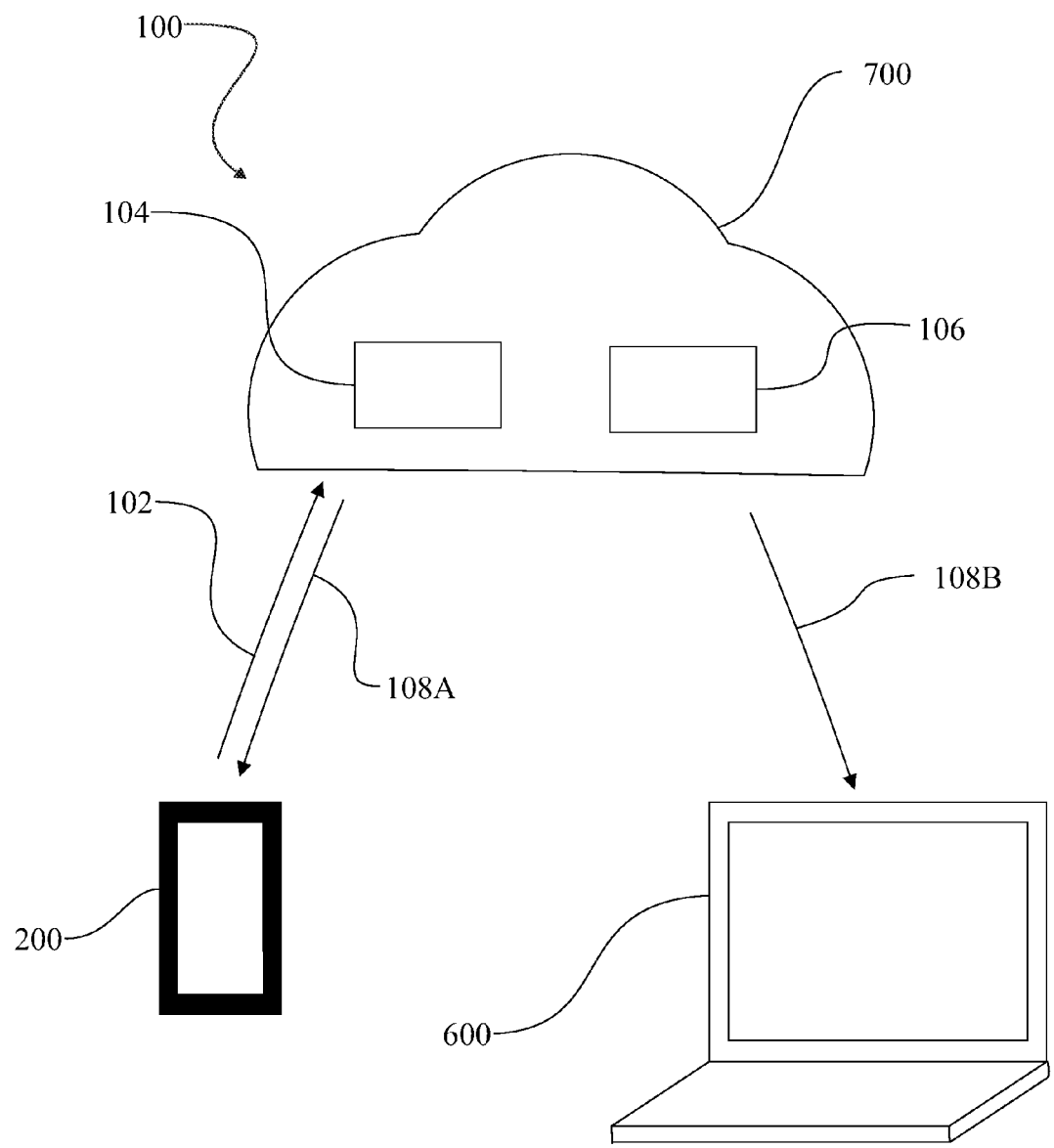
FIG. 5 presents a detailed schematic of how information is exchanged between a device and a remote server, which is capable of generating a model file.

At the end of the scanning step 102, the plurality of images is transferred to a processor via the communication mechanism. For exemplary purposes, the processor may be on a remote server 700. As shown in FIG. 5, the device 200 transmits the plurality of images to the processor 700 in the scanning step 102. In an alternate embodiment, the processor is located on the device 200. It is contemplated that when a user transfers the plurality of images to the processor 700 the user is charged a fee. The fee may be paid by an on-line payment processing system which is available on the server. For exemplary purposes, the on-line payment processing system may be a system for transferring funds from a bank account, credit card, or on-line account capable of storing and transferring money. The fee charged may be relative to the size of the plurality of images which are uploaded or relative to a selected resolution of the model desired. Alternatively, the fee may be a flat rate for each time a user uploads a plurality of images in a reconstruction step 104, or some combination thereof Once the plurality of images have been transmitted to the processor on the remote server 700, a reconstruction step 104 and a generation step 106 are performed on the plurality of images. The remote server 700 has a non-transitory computer readable medium with a series of instructions capable of performing both the reconstruction step 104 and the generation step 106. In a positioning step 802 within the reconstruction step 104, an optimization is performed on the plurality of images to simultaneously determine a pose of the image capture device for each image in the plurality of images, as well as a camera matrix for the image capture device used, the camera calibration matrix or camera intrinsics, as well as one or more radial distortion parameters. The pose of the image capture device includes an X, Y, and Z location in a universal coordinate frame, which describes distances from an origin in a three dimensional coordinate system along three orthogonal basis vectors. The pose of the image capture device also includes a roll, a pitch, and a yaw, which correspond to rigid body rotations about each of the three orthogonal basis vectors. The total pose of the image capture device may be described as <x, y, z, r, p, q>, or may also be given as a translation in three dimensions plus a quaternion, or a rotation matrix and translation vector. The camera matrix includes a two-dimensional center point, a focal length in a first axis, and a focal length in a second axis. In addition, one or more radial distortion factors which describes a radial distortion associated with the plurality of images due to a lens used in the image capture device is extracted. As an alternative to a single radial distortion factor expressing, for example a fish-eye lens, a series of coefficients may be extracted which expresses additional radial distortion parameters if the lens model is a polymer. For exemplary purposes, the optimization is a non-linear least squares optimization using a series of points associated with the regular pattern of first shapes 302 and second shapes 304 as determined in every image.

In an alternative embodiment, the device 200 is equipped with a plurality of sensors. The sensors may include accelerometers, sonar, gyroscopes, magnetometers, laser range finder, and global positioning systems. As shown in FIG. 4, in this alternative embodiment, the surface 300 with the regular pattern of first shapes 302 and second shapes 304 is not required. In the scanning step 102, sensor data from the plurality of sensors is also acquired between every image captured in the plurality of images. The sensor data is also sent to the processor in the scanning step. In the reconstruction step 104, the optimization is performed not over the series of points associated with the regular pattern of first and second shapes 302 ad 304, but features extracted from each image in the plurality of images, as well as the sensor data. A feature conveys data which is unique to the image at a specific pixel location, such as unique image gradients or pixel intensities. For exemplary purposes, the features may be Harris corners, FAST features, FREAK features, SIFT features, ORB features, SURF features, BRISK features, or the like.

Continuing in the reconstruction step 104, once the pose of the image capture device and the camera matrix is determined for every image in the plurality of images, it is possible to estimate the depth at specific images in the plurality of images using both intensity values contained in the image as well as the image capture device pose for every image. For exemplary purposes, the depth may be acquired by a minimization of an energy defined by $$E = \int_\Omega e^{-\alpha |\nabla I_r|^\beta} |\nabla \xi| + \frac{1}{2\theta}(\xi - \alpha)^2 + \lambda C(\vec{u}, \alpha) d\Omega$$

where a cost, C, is given by $$C(\vec{u}, \alpha) = \frac{1}{\tilde{I}} \sum_m \left| I_r(\vec{u}) - I_m(\vec{W}(\vec{u}, \alpha)) \right|$$

and a warping function, W, is given by $$\vec{W}(\vec{u}, \alpha) = \Pi \left( KT \frac{1}{\alpha} K^{-1} \begin{pmatrix} u_1 \\ u_2 \\ 1 \end{pmatrix} \right).$$

Here, Ir is the image intensity of a reference image, ξ is the inverse depth associated with a specific pixel location, u, a is a slack variable which is mediated by a mediation variable θ. K represents the camera matrix and T a transformation matrix from a reference image, Ir, and a comparison image, Im. π projects the three dimensional coordinate back into a two dimensional image plane. Any of the norms used in the energy equation may be L-1, L-2, or Huber. The exponential multiplied by the norm may be referred to as a weighting, so as to create a "weighted Huber norm", for example. Here, the weighed Huber norm is a regularizer. A regularizer provides a certain amount of smoothing by penalizing large jumps in the regularized variable. As with the norms, the regularizers may be in the form of a total variation, a total generalized variation, an L-1, L-2, Huber, or weighted Huber norm. In order to compute a minimum of the energy, a cost volume is calculated which stores the cost C for a fixed set of inverse depths for every pixel. The set of inverse depths ranges from some minimum inverse depth to some maximum inverse depth, progressing linearly. A cost volume voxel element is calculated for every pixel at every discrete level of inverse depth. The cost for every subset of the plurality of images may be a voxel-wise division of the sum, expressed above, divided by the voxel-wise number of frames which reproject into all other images in the set, I, referred to as a scaled cost volume. As an alternative to the absolute value of the single pixel difference in image intensities, the cost may be the sum of squared differences (SSD), sum of absolute differences (SAD), the Hamming distance between image census scores, the absolute value of a mean subtracted patch differences, or a normalized cross correlation. Here a census value of a pixel is a binary representation of all surrounding pixels in a patch as compared to the center pixel, where a value of 1 is given if the neighboring pixel intensity is of a greater value and a 0 if the neighboring pixel intensity is of a lower value than the center pixel.

Figure 6:
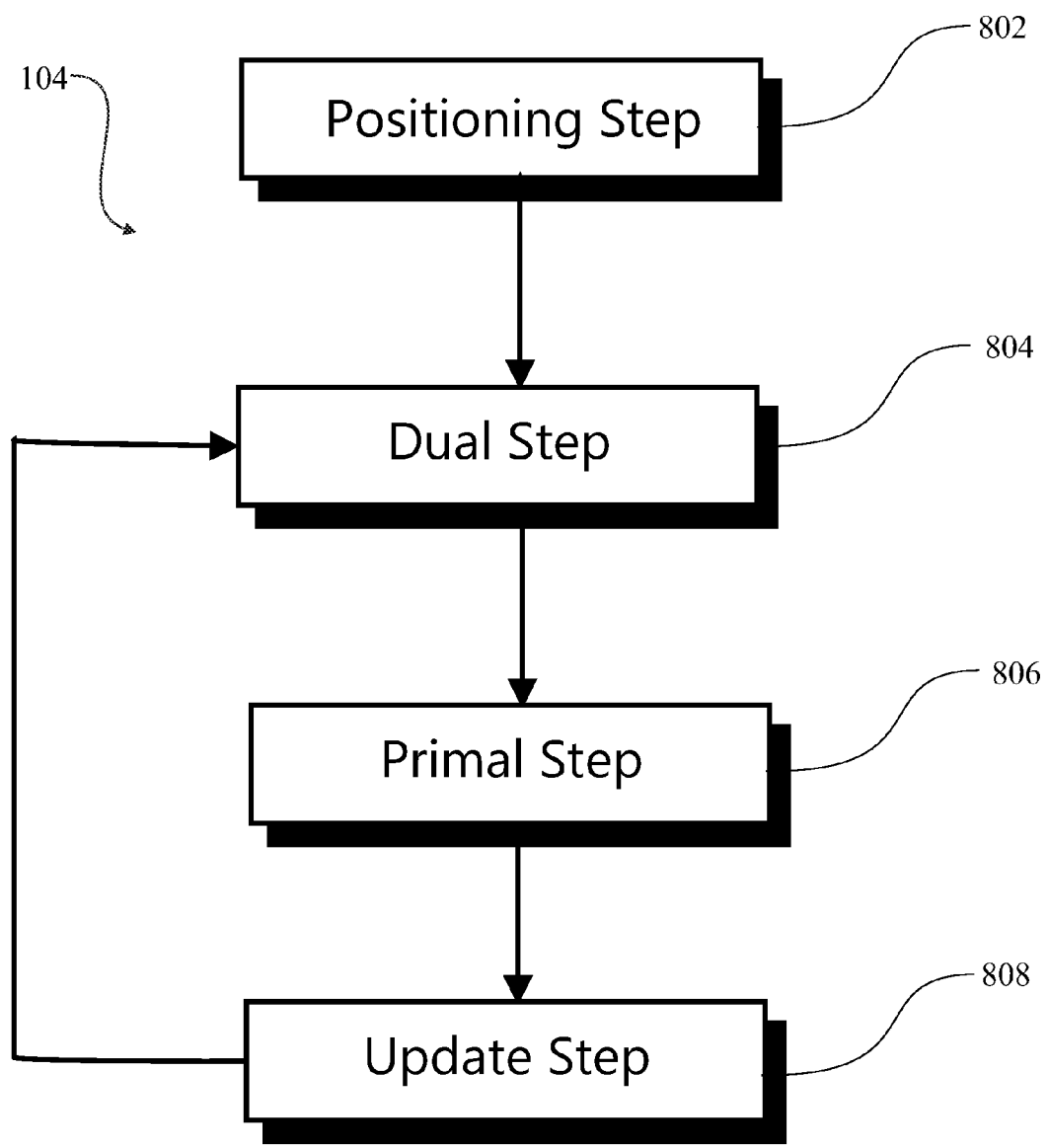
FIG. 6 presents a detailed flow diagram of the reconstruction step.

The minimum of the energy may be solved for by performing a Legendre-Fenchel transform and expressing the optimization in both a primal and dual variable. By expressing the problem in both the primal and dual forms, it is possible to use a primal-dual hybrid gradient approach to finding the minimum of the energy. Because a primal-dual hybrid gradient is used, the minimum may be determined by performing a primal descent and a dual ascent for every pixel in the image in parallel on a graphics processing unit (GPU). Alternatively, the minimization may be performed on a Field Programmable Gate Array (FPGA). As shown in FIG. 6, after the positioning step 802, sequential subsets of the plurality of images are used to form a depth image, wherever a depth image is desired, by first determining the inverse depth for every pixel in the cost volume which maps to the lowest cost, C. Once a minimum is estimated, a dual ascent is performed in dual step 804, a primal ascent is performed in a primal step 806 and an update is performed in an update step 808. In the update step 808, a similar search through the cost volume is performed as in the depth estimate, however the search is augmented by the difference of the primal variable with the slack variable, squared, divided by twice the mediation variable. Further, in the update step 808, the mediation variable is decremented. The dual step 804, primal step 806, and update step 808 are repeated until a stopping criterion is reached. For exemplary purposes, the stopping criterion is reached once the mediation variable is reduced below a threshold or a change in the energy computed is below a certain threshold. Once the stopping criterion is reached, the depth at every pixel calculated is stored in a depth image.

Alternatively, a buffer of 60 frames is created from the video sequence. If a previous depth image is known (determined via the previous depth estimate or by raycasting a truncated signed distance function storing a fusion of previous depth estimates), the full pose of the image capture device for every image is updated by performing dense tracking using the previous depth estimate, image taken at the previous depth estimate, and a current image. Dense tracking calculates the pose by performing a minimization with respect to the pose of a reprojection error between the previous image, the previous depth, and the current image using every pixel of both images.

The cost volume is then constructed by selecting a reference frame from the image sequence. A subset of images from the buffer are then selected which are more than at least 0.5 cm to 2.0 cm from one another, taken at a range of 15 cm to 1 m from the object. The reference image is selected such as to be between the subset of images. The subset of images consists of 20 images. A cost volume is constructed using 64 levels of inverse depth from a minimum inverse depth of 0.4 inverse meters to a maximum inverse depth of 5 inverse meters. While the number of levels, images used, inverse depths, image capture device ranges to the surface, and minimum separation are described above, other values may be contemplated. Each voxel element is calculated, as before, as the average of reprojection error between a pixel located in the reference image and the corresponding pixel reprojected into each comparison image in the subset of images. The corresponding pixel may not have integer coordinate values, in which case a bilinear interpolation of the intensity value is required. The reprojection error, once again, may be the absolute difference in intensity value, the Hamming distance of a census value, the SSD, SAD, NCC, or any mean-subtracted equivalent.

Once the cost volume is calculated, a depth per frame is calculated by first performing a minimum search along every inverse depth element for every pixel in the cost volume. This rough depth estimate is then smoothed using a weighted Huber regularizer via the same primal-dual hybrid gradient optimization schema as above. To further increase the accuracy of the depth estimates, the output of the optimization is used to initialize a wide baseline polishing step. In this wide baseline polishing step, a linearization of reprojection errors from the reference image of four additional frames further from the reference frame than the 20 frame selected subset, but within 80 cm of the reference frame, is regularized with a similar weighted Huber regularizer and minimized using a primal-dual hybrid gradient approach yielding a depth image. This linearization of reprojection errors is a Taylor expansion about an initial depth, $d_0$, such that the intensity of a pixel corresponding to a reference pixel at coordinate, x, and depth, d, is approximated as:

$$E(x,d)=I_r(x)-[I_k(w(x,k,d_0))+(d-d_0)\nabla_d I_k(w(x,k,d_0))],$$

where the reference image and the comparison image have a relative pose transformation, $T_{kr}$, dentoed by k in the warping function, w.

All of the depth images form a series of depth images. Since the pose of the device 200 is known relative to the surface 300, it is possible to remove all information from the depth image that is at or below the surface 300. This leaves only the object 400 in an updated depth image. The series of updated depth images may be stored in a volumetric representation of depth. For exemplary purposes, the volumetric representation of depth is a signed distance function. Each depth image is then loaded into the signed distance function representation.

In the generation step 106, a model is formed using the volumetric representation of depth and stored in a model file. For exemplary purposes, the model file is a mesh. Further, it is contemplated that the model file is created from the volumetric representation of depth. One such volumetric representation of depth is a signed distance function. Alternatively, a truncated signed distance function may be used. Once every image is acquired, it is fused into the signed distance function. The model file may be extracted from a signed distance functions by such algorithms as marching cubes, marching tetrahedral, or Poisson reconstructions.

The signed distance function, or SDF, is another voxel representation storing various elements in each voxel, such as the distance to the closest surface, color information, and a weight. The SDF is chosen to have 400×400×400 voxel elements, each representing $11400^{th}$ of a meter in all directions, though other dimensions may be contemplated, both in number of elements and size. The SDF is limited by the amount of graphics memory available to the graphics processing unit. In order to position the SDF to capture the most amount of data, the following steps are performed. First, a principle focus point is determined by performing a minimization over all image capture device poses for a point in the world which is seen in all image capture device. This is done by performing a non-linear least squares optimization, minimizing a coordinate in the world which projects into the image capture device for every acquired image. An X and Y coordinate of the principle focus point is used to center the SDF. A Z coordinate of the SDF is then chosen such that a bottom of the SDF is located 5 cm below the surface 300. At any point in time, the SDF may be raycasted from any pose. Raycasting is a procedure which, given a pose, "casts a ray" into the SDF from every pixel location in a virtual camera to provide a recorded depth image at the pose provided.

In the distribution step 108, the model file is then made available for download to any device. As shown in FIG. 5, the model file is transferred to either the device 200 or a system 600 capable of reading the model file. For exemplary purposes, the system 600 is a computer. The model file may also be transferred to a 3D printer which is capable of printing out a model derived from the model file. Because the model which is created is a highly accurate representation of a scanned object, the model file may also be used to suggest sizing information for apparel or footwear where the scanned object is a foot, head, full body, or some body subsection.

It is contemplated that when a user transfers the model file to the device 200 or the system 600 that the user is charged a fee. The fee may be paid by an on-line payment processing system which is available on the server. For exemplary purposes, the on-line payment processing system may be a system for transferring funds from a bank account, credit card, or on-line account capable of storing and transferring money. The fee charged may be dependent on the quality of the model file which is transferred in the distribution step 108. Alternatively, the fee charged may be the same for each time a model file is transferred in a distribution step 108. The distribution service may be one in the same as the remote server 700, or may be an alternate server. The distribution service records and tracks all user requests for generation of model files, as well as charges the user based on the personal information provided.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

We claim:

1. A system for providing a user with a 3D model including a non-transitory computer readable medium having instruction that, when executed, cause one or more processers to perform the following steps:
   a. receive a plurality of images from an image capture device which was at least 15 cm from a surface, but not more than 1 m from the surface;
   b. determine a pose of the image capture device for each image in the plurality of images, camera intrinsics for the capture device including a focal point and an image center, and one or more radial distortion factors;
   c. rectify each image in the plurality of images using the one or more radial distortion factors;
   d. create a buffer of 60 sequential images from the plurality of images;
   e. select a reference image from the buffer;
   f. select a subset of 20 comparison images from the buffer such that each comparison image is at least 0.5 cm to 2.0 cm from any other comparison image and the reference image;
   g. generate a cost volume from the subset of comparison images and the reference image;
   h. estimate a depth image from the cost volume;
   i. fuse the depth image into a signed distance function (SDF);
   j. shift the buffer by removing the first 20 frames and adding 20 more sequential images from the plurality of images to the end of the buffer;
   k. repeat steps e through j until there are no more images in the plurality of images;
   l. create a 3D model from the signed distance function; and
   m. send the 3D model to an end user, wherein the 3D model generated is of an object placed on the surface.

2. The system of claim 1, wherein the cost volume is a volumetric representation, having a two dimensional pixel coordinate and a one dimensional inverse depth coordinate, each voxel of the volume storing an average reprojection error between each pixel in the reference image with each corresponding pixel of every image of the comparison images parameterized for a number of levels of inverse depth from a minimum inverse depth to a maximum inverse depth and further where the reprojection error is one of the set comprised of an absolute value of a difference in intensity values of each pixel located in the reference image and each corresponding pixel in every comparison image, a sum of absolute differences of a patch centered at each pixel in the reference image and each corresponding pixel in every comparison image, a sum of squared differences of a patch centered at each pixel in the reference image and a patch centered at each corresponding pixel in every comparison image, and a Hamming distance of a census value of each pixel in the reference image and each corresponding pixel in every comparison image, and further wherein the corresponding pixel is calculated via a warping function defined as follows:

$$\begin{pmatrix} u' \\ v' \\ 1 \end{pmatrix} = \Pi \left[ K T_{kr} \frac{1}{\xi} K^{-1} \begin{pmatrix} u \\ v \\ 1 \end{pmatrix} \right],$$

where u' and v' are the new pixel coordinate, $\Pi$ the projection operator, K a camera calibration matrix, $T_{kr}$ a transformation from some frame k to the reference frame r, and $\xi$ the inverse depth, and further wherein if the corresponding pixel represents non-integer location a bilinear interpolation is used to extract approximate intensity values from the comparison image.

3. The system of claim 2, wherein the number of levels of inverse depth is 64 and the minimum inverse depth is 0.4 $m^{-1}$ and the maximum inverse depth is 5 $m^{-1}$.

4. The system of claim 1, wherein the depth image is estimated from the cost volume by performing a search for a minimum reprojection error at each pixel coordinate along the inverse depth coordinate and further wherein the inverse of the inverse depth coordinate corresponding to the mimimum reprojection error represents the depth at each pixel coordinate and further wherein the linear search over the cost volume is performed in parallel on a graphics processing unit.

5. The system of claim 4, wherein the depth image is further refined by performing the steps comprising:
   a. denoising the depth image by minimizing the energy of a total variation regularizer of depth and an L1 norm of the difference of the initial depth estimate and a denoised depth estimate using a primal-dual hybrid gradient descent in parallel on a graphics processing unit to create a denoised depth image;
   b. using the denoised depth image as an initialization for a wide-baseline refinement by using four additional images from the buffer which are further from the reference image than the comparison images, but not more than 80 cm away from the reference image and performing a primal-dual hybrid gradient on an L1 norm of an error function representation of a first order linear expansion of a sum of a photometric error of the four additional images with respect to a depth coordinate in addition to a weighted Huber regularizer, performed on a graphics processing unit, the error function representation described mathematically as $$E(x,d)=I_r(x)-[I_k(w(x,k,d_0))+(d-d_0)\nabla_d I_k(w(x,k,d_0))].$$

6. The system of claim 1, wherein the pose of the image capture device associated with every image is determined by placing a grid consisting of a regular pattern of rows and columns of a first shape and a second shape of known sizes on the surface, such that any observed subset of the grid provides an initial estimate of a pose for every observation and subsequently performing a non-linear least squares optimization over a cost comprised of pose information and camera calibration information on the initial poses for every observation of the surface to refine the pose associated with every image, as well as determine the camera intrinsics and one or more radial distortion factors.

7. The system of claim 6, wherein the first shape is a circle and the second shape is a circle having a radius such that it can be differentiated from the first shape.

8. The system of claim 6, wherein each pose of an image capture device is further refined by performing the following steps:
   a. performing a raycasting operation on the SDF from the pose of the reference frame to generate a reference depth image and a weighting image; and
   b. performing a non-linear least squares optimization of the pose by minimizing a reprojected cost for every pixel in the reference image as compared with a comparison image as reprojected through the reference depth image and further wherein the optimization is initialized with the relative pose between the reference image and the comparison image and further where the reprojection cost of every pixel is weighted by a corresponding pixel in the weighting image.

9. The system of claim 1, wherein the pose and camera intrinsics of the image capture device for every image is determined by extracting features selected from the set comprised of FAST, FREAK, ORB, BRIEF, SIFT, SURF, and AKAZE for every image in the sequence of images, performing feature matching between features extracted on every images to determine a set of matched features, and implementing a non-linear least squares optimization for the poses and camera calibration and one or more radial distortion parameters using a cost function which is a function of reprojection error of the matched features.

10. The system of claim 9, wherein the cost function also comprises other sensor data received by the one or more processors and further wherein the other sensor data is data from the set comprised of laser range data, accelerometer data, gyroscopic data, magnetic field data, and global positioning system data.

11. The system of claim 1, wherein the fusing of depth estimates is done by projecting the depth values from the pose of the image capture device into the SDF, the SDF having 400×400×400 contiguous voxel elements, each voxel representing 1/400th of a meter on each side such that the SDF as a whole represents 1 $m^3$, and further wherein the SDF is initialized at a location by performing a non-linear least squares optimization to determine a principle focus point, where the principle focus point is a point which is observed in a most amount of images from the image sequence, using an X and a Y coordinate of the principle point to center the SDF on an X-Y plane, and choosing a Z-coordinate of the SDF such that a lowest level of the SDF is located 5 cm below the surface.

12. The system of claim 1, wherein the 3D model is created from the SDF by assigning each voxel of the SDF an index, where the index is based on distance information contained in all neighboring voxels, and further wherein a mesh element is created at a voxel position based on the index.

13. The system of claim 1, wherein a desired resolution of the 3D model is selected by a user and, based on the resolution selected, the end user is charged a fee, and further wherein the 3D model is not transferred to the end user until the fee has been paid.

14. The system of claim 1, wherein the 3D model is of an object selected from the set comprised of a foot, a hand, a body, and a head, and further wherein the 3D model is used to suggest an optimal garment size.

15. The system of claim 1, wherein the 3D model is sent to a 3D printer.

16. The system of claim 1, wherein the image capture device and the one or more processors are not co-located on, or connected within, a single device.

17. A method for providing a user with a 3D model comprising the following steps:
   a. sending a plurality of images from an image capture device which was at least 15 cm from a surface, but not more than 1 m from the surface to one or more processors;
   b. determining a pose of the image capture device for each image in the plurality of images, camera intrinsics for the capture device including a focal point, an image center, and one or more radial distortion factors;
   c. rectifying each image in the plurality of images using the one or more radial distortion factors;
   d. creating a buffer of 60 sequential images from the plurality of images;
   e. selecting a reference image from the buffer;
   f. selecting a subset of 20 comparison images from the buffer such that each comparison image is at least 0.5 cm to 2 cm from any other comparison image or the reference image;
   g. generating a cost volume from the subset of comparison images and the reference image;
   h. estimating a depth image from the cost volume;
   i. fusing the depth image into a signed distance function (SDF);
   j. shifting the buffer by removing the first 20 frames and adding 20 more sequential images from the plurality of images to the end of the buffer;
   k. repeating steps e through j until there are no more images in the plurality of images;
   l. creating a 3D model from the signed distance function; and
   m. sending the 3D model to an end user, wherein the 3D model generated is of an object placed on the surface.

18. The method of claim 17, wherein the pose of the image capture device associated with every image is determined by placing a grid consisting of a regular pattern of rows and columns of a first shape and a second shape of known sizes on the surface, such that any observed subset of the grid provides an initial estimate of a pose for every observation and subsequently performing a non-linear least squares optimization over a cost comprised of pose information and camera calibration information on the initial poses for every observation of the surface to refine the pose associated with every image, as well as determine the camera intrinsics and one or more radial distortion factors.

19. The method of claim 17, wherein the pose and camera intrinsics of the image capture device for every image is determined by extracting features selected from the set comprised of FAST, FREAK, ORB, BRIEF, SIFT, SURF, and AKAZE for every image in the sequence of images, performing feature matching between features extracted on every images to determine a set of matched features, and implementing a non-linear least squares optimization for the poses and camera calibration and one or more radial distortion parameters using a cost function which is a function of reprojection error of the matched features.

20. The method of claim 17, wherein a desired resolution of the 3D model is selected by the end user and, based on the desired resolution, the end user is charged a fee, and further wherein the 3D model is not transferred to the end user until the fee has been paid.

\* \* \* \* \*